(12) United States Patent
Lin

(10) Patent No.: US 6,230,601 B1
(45) Date of Patent: May 15, 2001

(54) DEVICE FOR SUPPORTING A SAW

(76) Inventor: Huang Lung Lin, No. 33-2, Pu Gang Road, Pu Yien Hsiang, Chang Hua Hsien (TW), 516

( * ) Notice: Subject to any disclaimer, the term of this patent is extended or adjusted under 35 U.S.C. 154(b) by 0 days.

(21) Appl. No.: 09/256,678

(22) Filed: Feb. 23, 1999

(51) Int. Cl.⁷ ...................................................... B27G 5/02
(52) U.S. Cl. .................................. 83/766; 83/767; 83/581
(58) Field of Search ............................... 53/574, 762, 781, 53/581, 763, 764, 765, 766, 767, 954

(56) References Cited

U.S. PATENT DOCUMENTS

| | | | |
|---|---|---|---|
| 187,431 | * | 2/1877 | Tierney ................................... 83/763 |
| 240,737 | * | 4/1881 | Lewis ..................................... 83/581 |
| 646,479 | * | 4/1900 | Wilkinson .............................. 83/763 |
| 651,457 | * | 6/1900 | Dorn ...................................... 83/765 |
| 876,795 | * | 1/1908 | Galentine .............................. 83/766 |
| 999,769 | * | 8/1911 | Fish ........................................ 83/763 |
| 1,708,641 | * | 4/1929 | Trepte ................................... 83/581 |
| 3,385,330 | * | 5/1968 | Haynes .................................. 83/581 |
| 3,881,386 | * | 5/1975 | Zimmerman .......................... 83/762 |
| 4,226,152 | * | 10/1980 | Bies ....................................... 83/581 |
| 4,262,571 | * | 4/1981 | King et al. ............................. 83/762 |
| 4,346,636 | * | 8/1982 | Taylor .................................... 83/767 |
| 4,377,959 | * | 3/1983 | DeCarolis .............................. 83/762 |
| 5,259,286 | * | 11/1993 | Chen ...................................... 83/581 |
| 5,392,679 | * | 2/1995 | Wang ..................................... 83/766 |
| 5,560,273 | * | 10/1996 | Keddie ................................... 83/767 |
| 5,605,086 | * | 2/1997 | Huang-Mo et al. ................... 83/759 |
| 5,713,258 | * | 2/1998 | Keddie ................................... 83/766 |

* cited by examiner

Primary Examiner—M. Rachuba
(74) Attorney, Agent, or Firm—Dougherty & Troxell

(57) ABSTRACT

A device for supporting a saw includes a board having one or more posts extending upward for slidably engaging with one or more frames and for allowing the frames to move up and down along the posts. The frames each includes one or more sleeves for slidably engaging with the saw and for allowing the saw to be slided relative to the frames and the posts. The board is rotatably secured to a base or to a work table and includes an angular graduation for indicating an angular position of the board relative to the base.

4 Claims, 10 Drawing Sheets

DEVICE FOR SUPPORTING A SAW

BACKGROUND OF THE INVENTION

1. Field of the Invention

The present invention relates to a device, and more particularly to a device for supporting a saw.

2. Description of the Prior Art

Typical hand saws are used for sawing wood workpieces or the like manually. No support devices may be used for supporting the hand saws and for allowing the hand saws to saw the workpieces.

The present invention has arisen to mitigate and/or obviate the afore-described disadvantages of the conventional hand saws.

SUMMARY OF THE INVENTION

The primary objective of the present invention is to provide a device for supporting a saw and for allowing the saw to be operated effectively and accurately.

In accordance with one aspect of the invention, there is provided a device for supporting a saw, the device comprising a) a board including at least post extending upward, b) the saw including a longitudinal rod, and c) at least one frame slidably engaged on the post for allowing the frame to move up and down along the post, the frame includes at least one sleeve for slidably engaging with the longitudinal rod and for allowing the saw to be slided relative to the frame and the post.

The frame includes a ring slidably engaging with the post for allowing the frame to move up and down along the post.

The board is rotatably secured to a base at a pivot shaft and includes an angular graduation for indicating an angular position of the board relative to the base, and fastening device for fastening the board to the base. The board includes a curved slot, the fastening device includes a fastener slidably engaged in the curved slot and engaged through the base for securing the board to the base. At least one support is secured on the base for supporting a workpiece, the support includes an upper surface having at least one bulge for engaging with the workpiece and includes a panel extended upward. At least one clamping device is secured to the support for clamping the workpiece. The clamping device includes a bracket, a first bolt threaded through the bracket and threaded to the support, a second bolt threaded through the bracket for engaging with the workpiece.

A work table is further provided for securing the board. The work table includes a plate secured on top, the board is rotatably secured on the plate at a pivot shaft. The plate includes an arrow provided on top, the board includes a window for viewing the arrow. The board includes a cavity. A fastening device is provided for fastening the board to the plate and includes a bolt slidably engaged in the plate, and a spring biasing the bolt to engage with the cavity of the board and for securing the board to the plate. The fastening device includes a tube secured in the plate, the tube includes a bottom portion having a recess, a pin is engaged through the bolt for engaging with the recess and the bottom portion of the tube, the spring biasing means is engaged between the bolt and the tube for biasing the bolt to engage with the cavity of the board.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
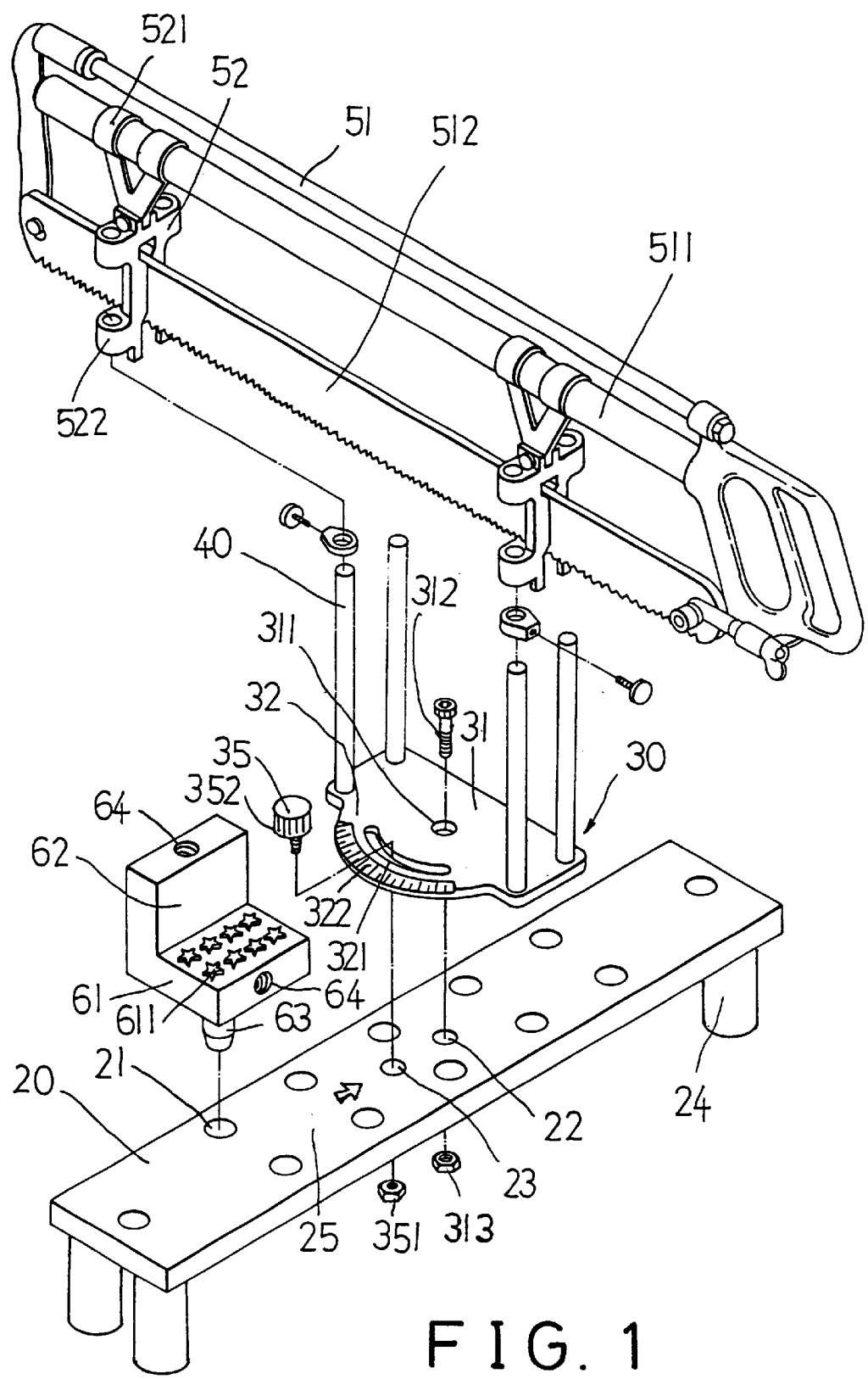
FIG. 1 is an exploded view of a saw supporting device in accordance with the present invention.
Figure 2:
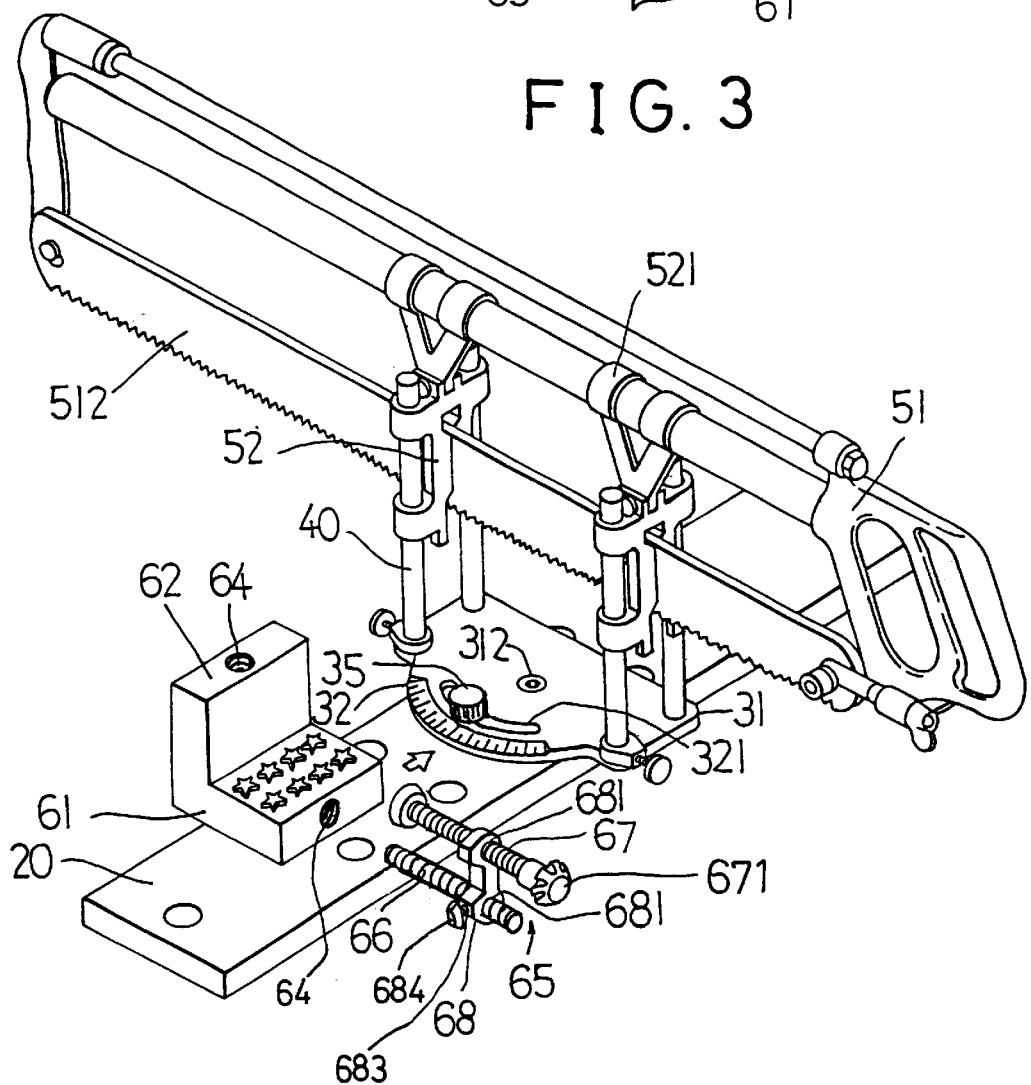
FIG. 2 is a perspective view of the saw supporting device.

Referring to the drawings, and initially to FIGS. 1 and 2, a device for supporting a saw comprises a base 20 having a number of holes 21, 22, 23 and having an arrow 25 provided on top and directing toward the holes 23, 22. The base 20 includes four legs or pads 24 extended downward from the four corners for spacing and for elevating the base 20 from the supporting surface. Without the pads 24, the base 20 may also be directly disposed on a table or the like.

A rotary member 30 includes a board 31 having a hole 311 for engaging with a pivot shaft 312 which may be in the form of a bolt for engaging with a nut 313 and for securing the board 31 to the base 20. The pivot shaft 312 is engaged through the hole 22 of the base 20. The board 31 includes a protractor 32 having a curved slot 321 and an angular graduation 322 for telling the angular position of the rotary member 30 by the indication of the arrow 25 to the angular graduation 322. A fastener 35 is engaged through the curved slot 321 and is engaged with a nut 351 and includes a head 352 for rotating the fastener 35 and for securing the board 31 to the base 20 at the required angular position. The board 31 includes one or more posts 40 extended upward.

A saw 51, such as a hand saw, includes a longitudinal rod 511 and a saw blade 512 substantially parallel to the longitudinal rod 511. One or more frames 52 each includes one or more sleeves 521 for slidably engaging with the longitudinal rod 511 and for allowing the saw 51 to be slided relative to the frames 52. The frames 52 each includes one or more rings 522 for engaging with the posts 40 and for allowing the frames 52 and the saw 51 to be guided to move up and down along the posts 40.

In operation, the saw 51 may be moved forward and rearward relative to the frames 52 and may be moved up and down along the posts 40. In addition, the board 31 may be adjusted to different angular positions, such that the saw 51 may be used for effectively and accurately sawing a workpiece engaged on the board 31. The most important characteristic of the saw supporting device is that frame(s) 52 may be moved up and down along the post(s) 40 and the saw 51 may be moved forward and rearward relative to the frame(s) 52 for allowing the saw 51 to saw the workpiece.

Figure 3:
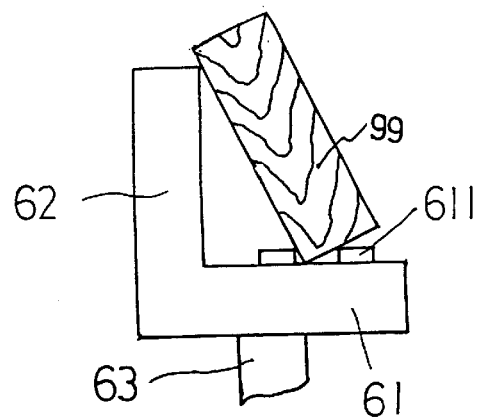
FIG. 3 is a plane view of a workpiece support.

As shown in FIGS. 1–3, one or more supports 61 each includes an extension 63 for engaging with the holes 21 of the base 20 and for securing to the base 20. The supports 61 each includes a panel 62 extended upward and each includes an upper surface having a number of bulges 611 for engaging with a workpiece 99 and for maintaining the workpiece 99 at a suitable angular position. It is preferable that two supports 61 are secured on the base 20 and are disposed on both sides of the rotary member 30 for supporting the end portions of the workpiece such that the middle portion of the workpiece may be supported above the board 31 and below the saw blade 512. As shown in FIG. 2, the support 61 and the panel 62 each includes a screw hole 64. One or more clamping devices 65 each has a bolt 66 for engaging with the screw holes 64 and each has a bracket 68 having two screw holes 681 for engaging with the bolt 66 and another bolt 67. The bolt 67 is preferably parallel to the bolt 66 and is threaded to the bracket 68 for clamping the workpiece in place. The bolt 67 includes a knob 671 for rotating the bolt 67. A fastener 684 is engaged with a screw hole 683 of the bracket 68 for securing the bolt 66 in place.

Figure 4:
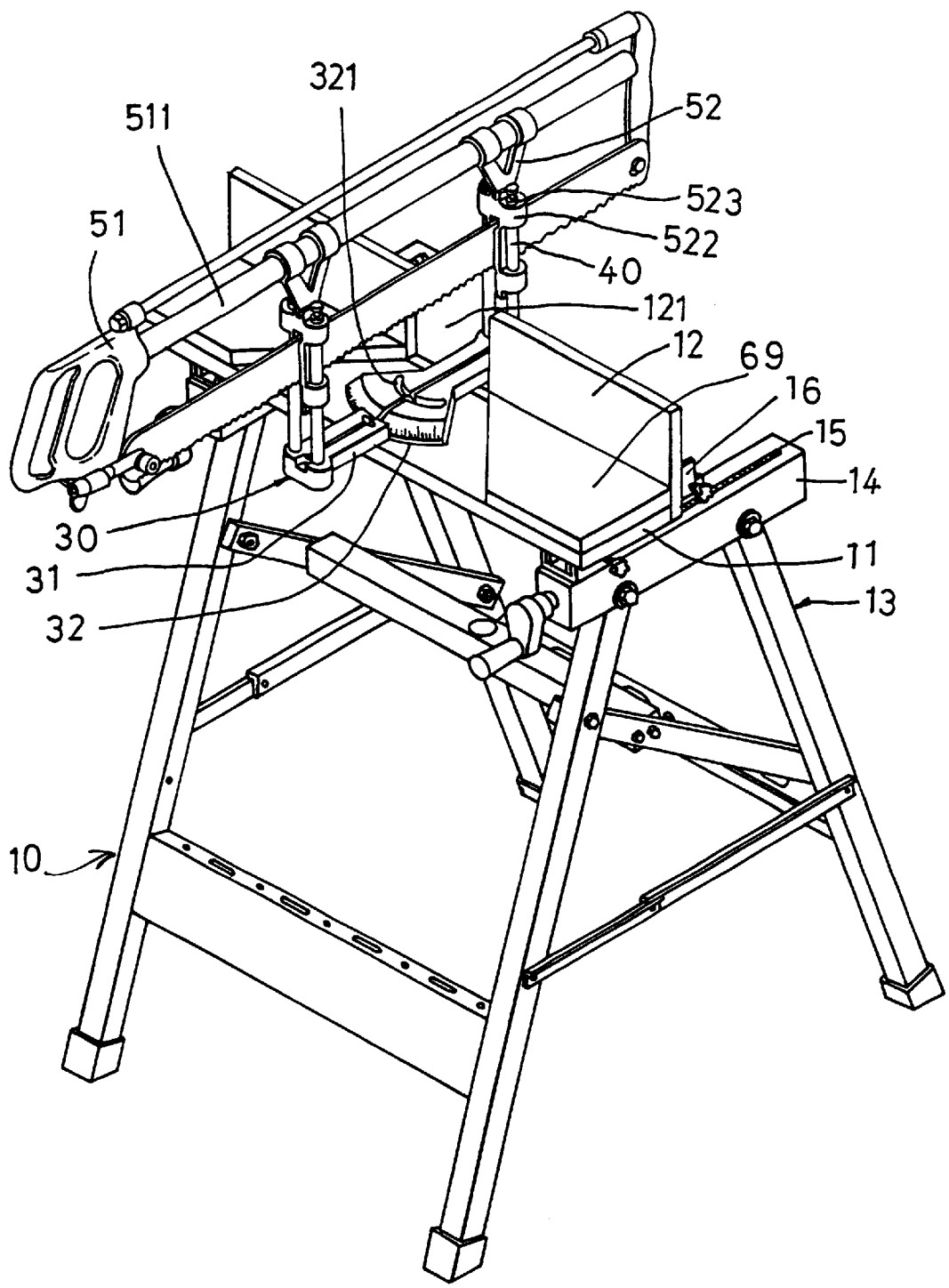
FIG. 4 is a perspective view showing the application of the saw supporting device.
Figure 5:
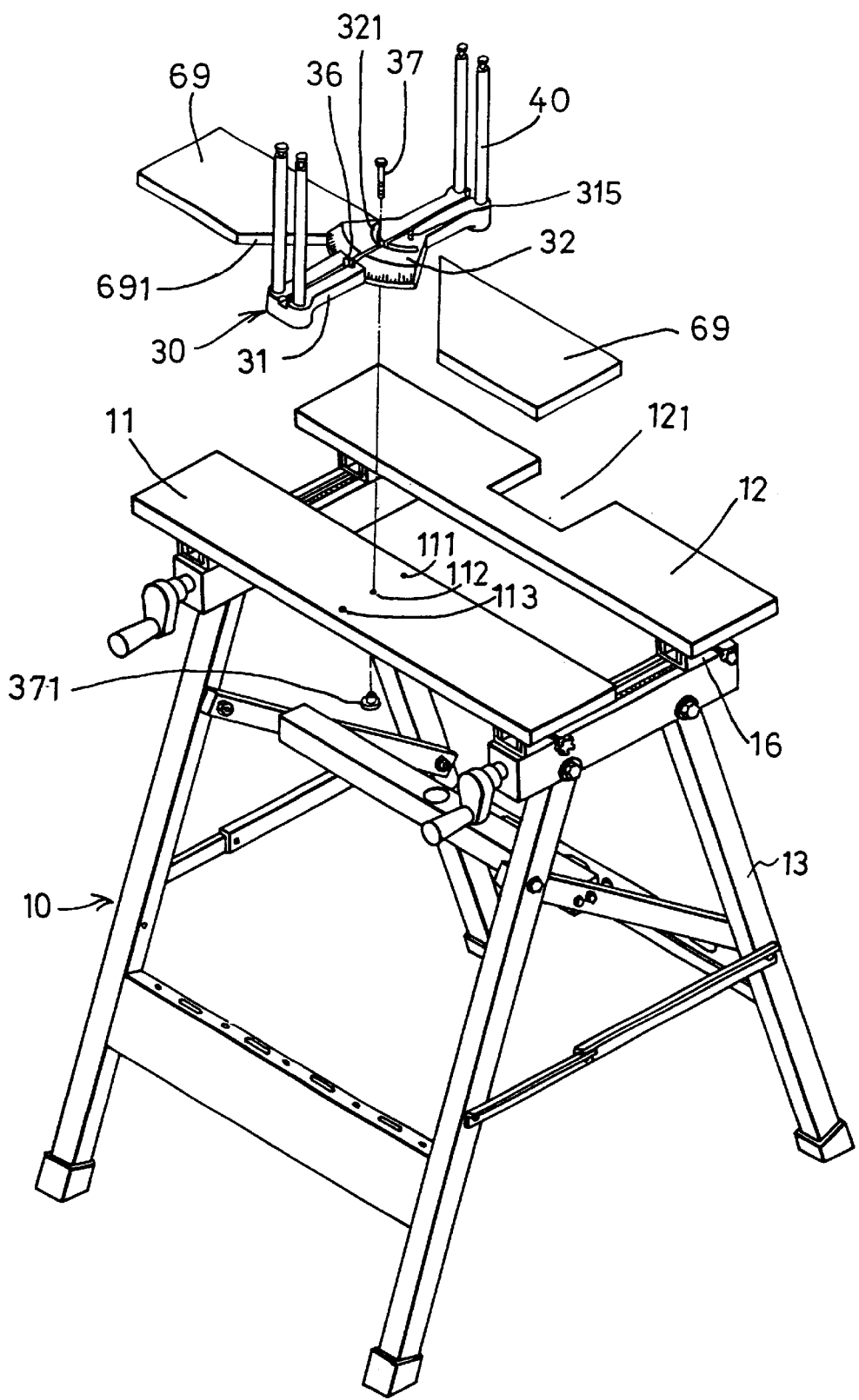
FIG. 5 is a partial exploded view of the saw supporting device as shown in FIG. 4.

Referring next to FIGS. 4 and 5, a work table 10 may be provided for supporting the saw supporting device. The work table 10 includes a stand 13 having two parallel beams 14 provided on top and includes a bolt 15 rotatably engaged in each of the beams 14. A plate 11 is fixed on top of the stand 13 and another plate 12 is rotatably secured on top of the stand 13 by an angular adjustable mechanism 16. Two blocks are secured to the angular adjustable mechanisms 16 and are slidably engaged in the beams 14 and threadedly engaged with the bolts 15 for allowing the bolts 15 to move the blocks and the angular adjustable mechanism 16 along the beams 14 when the bolts 15 are rotated. Two pads 69 are secured on ends of the plate 11 and each has a tapered cut off portion 691. A rotary member 30 includes a board 31 having a pivot shaft 315 extended downward and rotatably engaging in a hole 111 of the plate 11 (FIGS. 7, 8) for allowing the rotary member 30 to be rotatably secured on the plate 11. The rotary member 30 also includes a protractor 32 having a curved slot 321. A fastener 37 is engaged through the curved slot 321 and is engaged with a hole 112 of the plate 11 for engaging with a nut 371 and for securing the rotary member 30 to the plate 11. An arrow 114 (FIG. 9) is provided on top of the plate 11 for indicating the angular graduation. The board 31 includes a window 36 for viewing the arrow 114 and includes one or more posts 40 extended upward for engaging with the frames 52 and for supporting the saw in place. The plate 11 includes another hole 113 for engaging with a fastening device shown in FIGS. 7–9. The plate 12 includes an opening 121 for engaging with the board 31 (FIG. 4).

Figure 6:
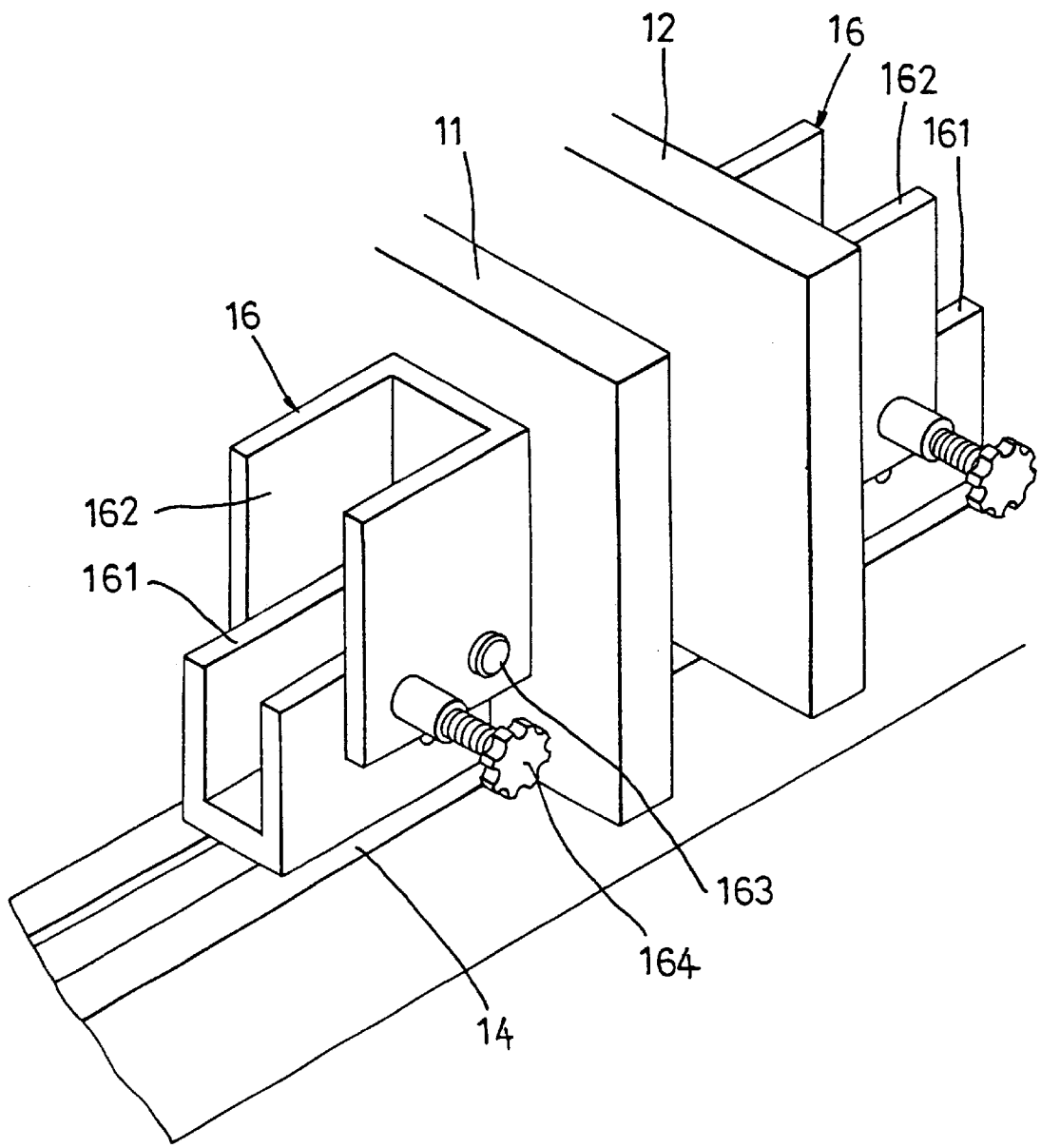
FIG. 6 is a partial perspective view of a workpiece clamping device.

As shown in FIG. 6, the plates 11, 12 may each secured on top of an upper member 162 of an angular adjustable mechanism 16. The upper members 162 are rotatably secured to a lower member 161 at an axle 163 and securable to the lower member 161 by a fastener 164, such that both the plates 11, 12 may be rotated to a position perpendicular to the beams for clamping a workpiece between the plates 11, 12.

Figure 7:
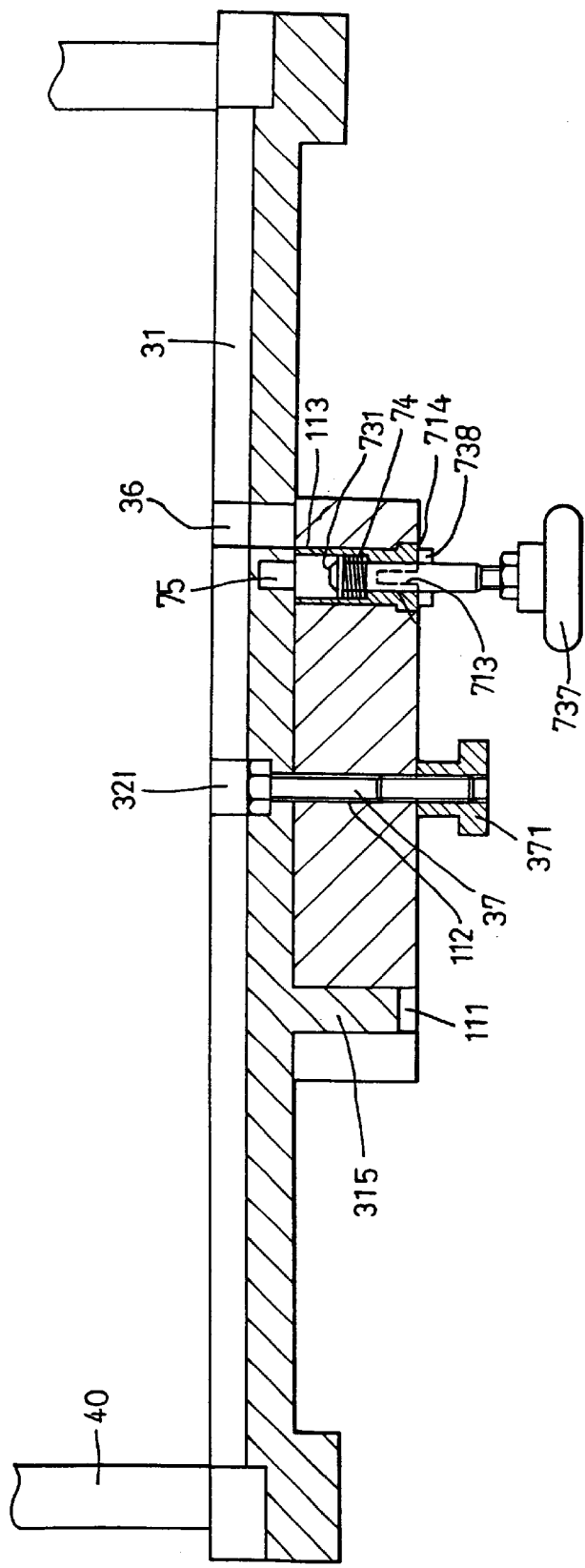
FIGS. 7 and 8 are cross sectional views showing the operation of the saw supporting device as shown in FIGS. 4 and 5.
Figure 8:
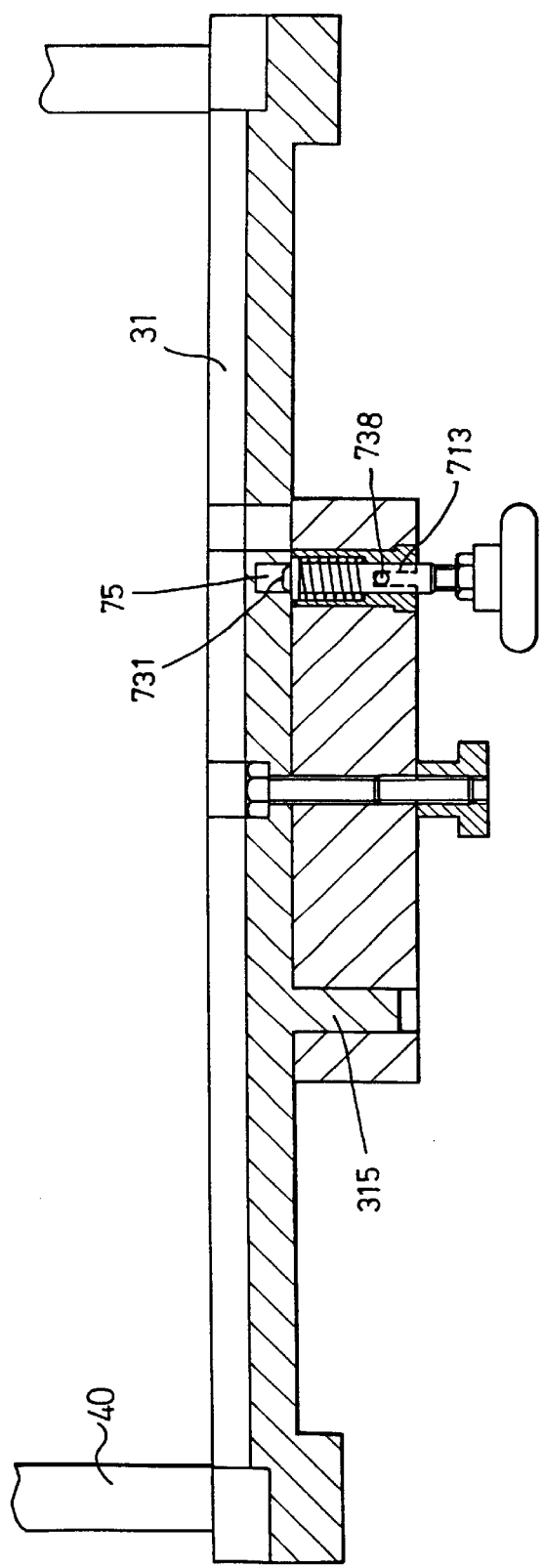
Figure 9:
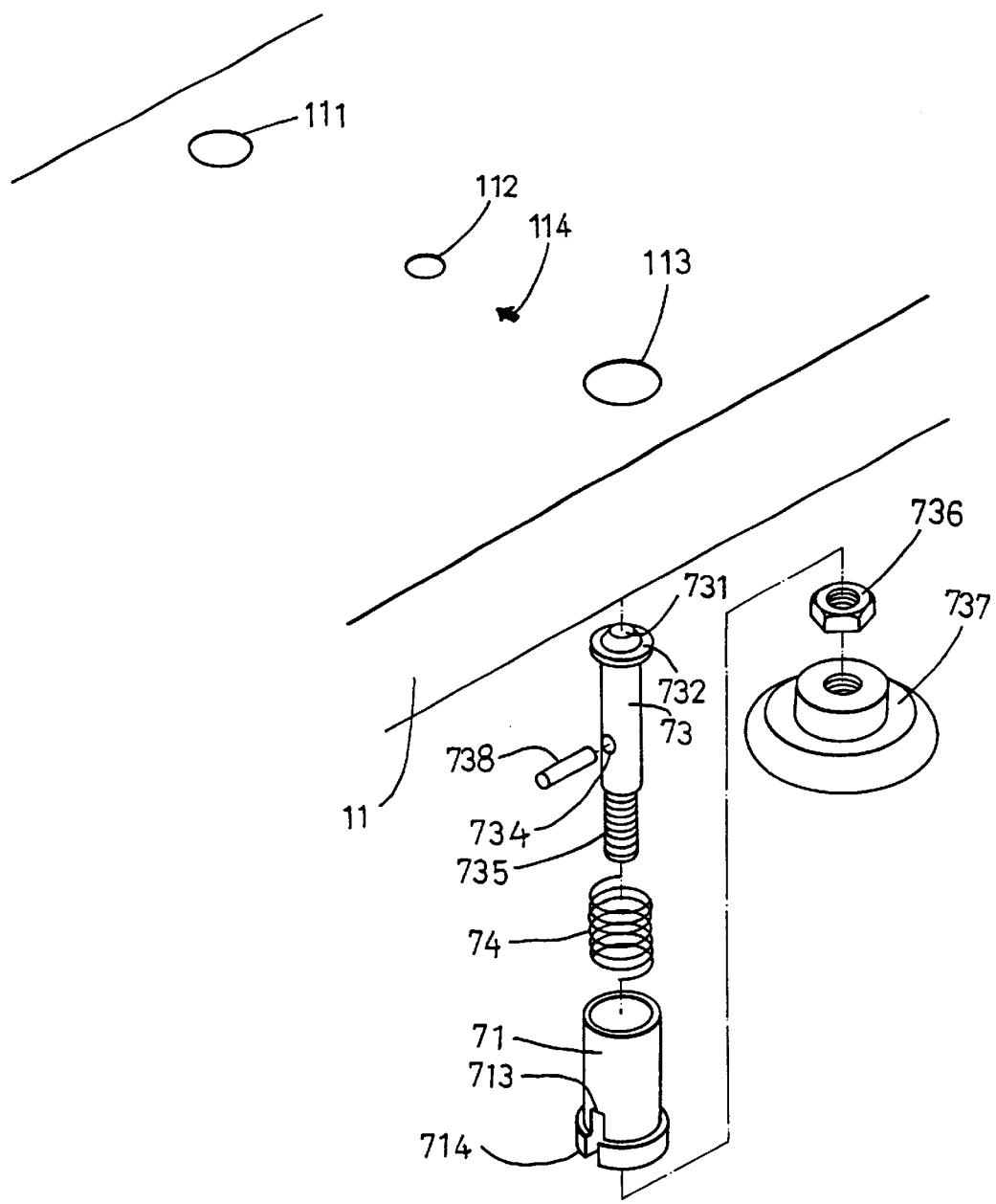
FIG. 9 is a partial exploded view illustrating the fastening device for the saw supporting device.

Referring next to FIGS. 7–9, a tube 71 is secured in the hole 113 of the plate 11 and includes a recess 713 formed in the bottom portion and includes a bottom surface 714. A bolt 73 is slidably engaged in the tube 71 and includes a tip 731 for engaging with a cavity 75 of the board 31 and for securing the board 31 in place relative to the plate 11. The bolt 73 includes an annular flange 732. A spring 74 is engaged between the annular flange 732 of the bolt 73 and the tube 71 for biasing the tip 731 of the bolt 73 to engage with the cavity 75 of the board 31. A pin 738 is engaged through a hole 734 which is formed in the middle portion of the bolt 73. The bolt 73 includes an outer thread 735 for engaging with a nut 736 and a knob 737. The pin 738 may be engaged in the recess 713 (FIG. 8) for allowing the tip 731 of the bolt 73 to engage with the cavity 75 of the board 31, and may be engaged with the bottom surface 714 of the tube 71 for disengaging the tip 731 from the cavity 75 (FIG. 7). The tip 731 of the bolt 73 may be biased to engage with the cavity 75 when the arrow 114 indicates the "0"-degree graduation.

Figure 10:
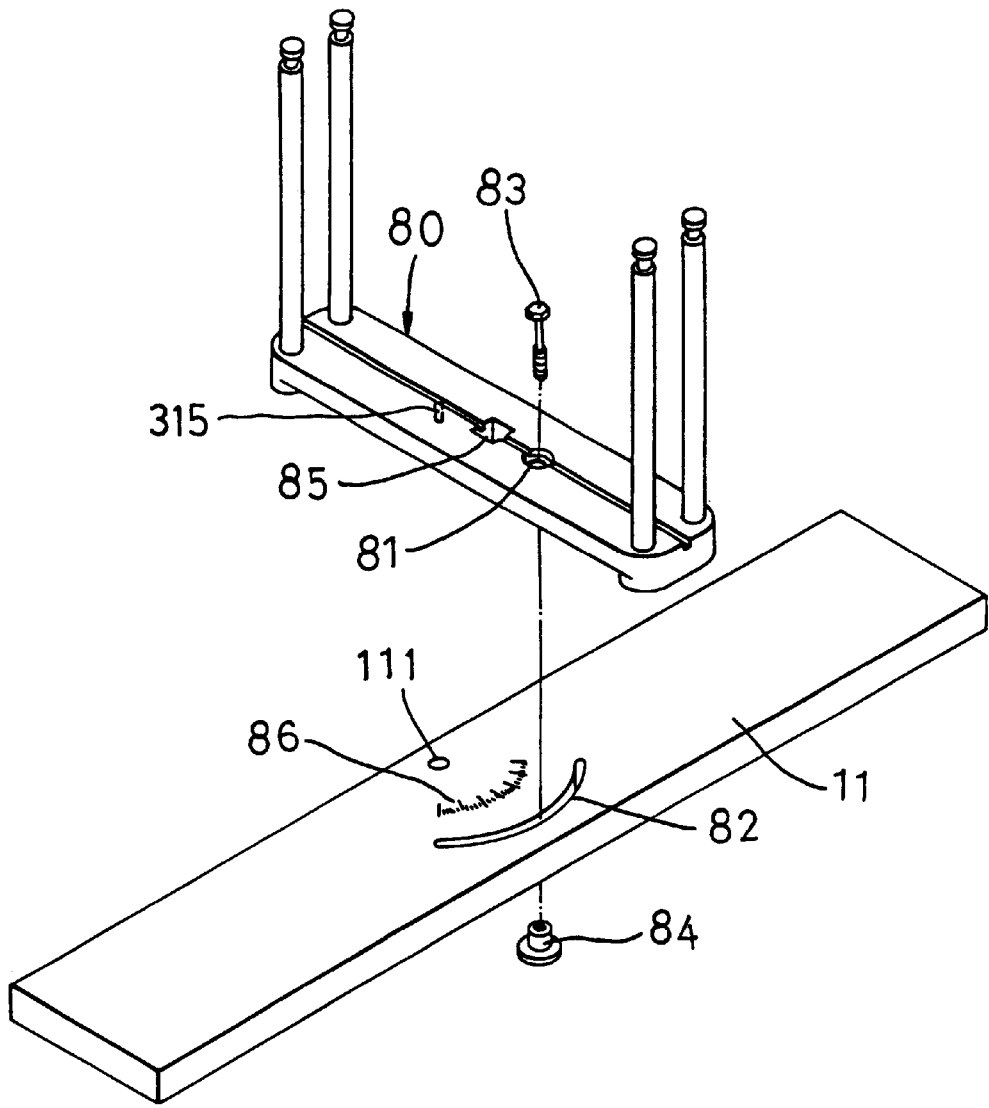
FIG. 10 is a partial exploded view illustrating another application of the saw supporting device.

Referring next to FIG. 10, alternatively, the board 80 includes a pivot shaft 315 for rotatably engaging in the hole 111 of the plate 11 and includes a window 85 for viewing the graduation 86 provided on the plate 11 and includes a hole 81 for engaging with a fastener 83 which is slidably engaged in a curved slot 82 that is formed in the plate 11. The fastener 83 is engaged with a nut 84 for securing the board 80 to the plate 11.

Figure 11:
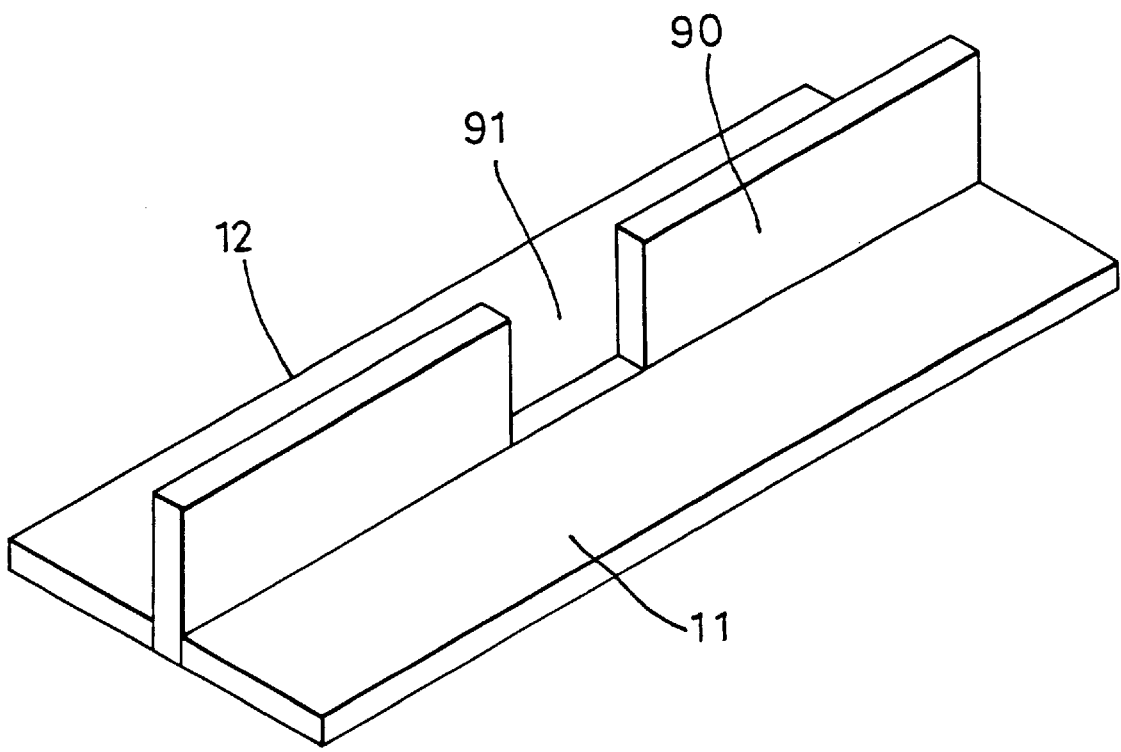
FIG. 11 is a partial perspective view showing a further application of the workpiece clamping device.

As shown in FIG. 11, a further plate 90 is secured between the plates 11, 12 and includes an opening 91 for engaging with the board 31.

Accordingly, the saw supporting device may stably support the saw for allowing the saw to effectively and accurately saw the workpiece.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for supporting a saw, said device comprising:
    a) a board including a cavity and at least one post extending upward,
    b) said saw including a longitudinal rod,
    c) at least one frame slidably engaged on said at least one post for allowing said at least one frame to move up and down along said at least one post, said at least one frame including at least one sleeve slidably engaged with said longitudinal rod for allowing said saw to be slided relative to said at least one frame and said at least one post;
    d) a work table for securing said board, wherein said work table includes a plate secured on top, said board being rotatable secured on said plate at a pivot shaft; and,
    e) a fastening device for fastening said board to said plate, wherein said fastening device includes a bolt slidably engaged in said plate, and a spring biasing said bolt to engage with said cavity of said board and for securing said board to said plate, a tube secured in said plate, said tube including a bottom portion having a recess, a pin engaged through said bolt for engaging with said recess and said bottom portion of said tube, said spring being engaged between said bolt and said tube for biasing said bolt to engage with said cavity of said board.

2. The device as claimed in claim 1, wherein said at least one frame includes a ring slidably engaging with said at least one post for allowing said at least one frame to move up and down along said at least one post.

3. The device as claimed in claim 1, wherein said board includes a curved slot, and said fastening device includes a fastener slidably engaged in said curved slot.

4. The device as claimed in claim 1, wherein said plate includes an arrow provided on top, and said board includes a window for viewing said arrow.

* * * * *